United States Patent [19]

Chisholm

[11] 4,331,268

[45] May 25, 1982

[54] SEAL FOR COMPRESSED AIR LINE DRAIN DEVICE

[76] Inventor: James R. Chisholm, 771 Coral Dr., Cape Coral, Fla. 33904

[21] Appl. No.: 70,427

[22] Filed: Aug. 29, 1979

[51] Int. Cl.³ .............. B01D 53/04; F16T 1/45; F16K 24/04; G01F 11/16

[52] U.S. Cl. .................... 222/361; 137/204; 222/362; 222/484; 222/542

[58] Field of Search ............ 137/204, 203; 251/327, 251/328; 222/361, 362, 367, 442, 451–453, 542, 559, 561, 484

[56] References Cited

U.S. PATENT DOCUMENTS

| 397,854 | 2/1889 | Green et al. | 222/367 X |
| 3,109,443 | 11/1963 | Mastis | 137/204 |
| 3,295,546 | 1/1967 | Carlton | 251/327 X |
| 3,936,031 | 2/1976 | Berman | 251/328 X |
| 4,135,542 | 1/1979 | Chisholm | 137/204 |

FOREIGN PATENT DOCUMENTS 9633 10/1932 Australia .................. 222/442
321499 10/1934 Italy ..................... 222/361

Primary Examiner—David A. Scherbel
Attorney, Agent, or Firm—Harvey B. Jacobson

[57] ABSTRACT

In a drain device for purging compressed air lines of water, oil, sludge, and other contaminants by the alignment of a first pair of apertures in a valving mechanism to allow the contaminants to enter a central chamber and periodically moving the central chamber to align a second pair of apertures to allow the contaminants to flow from the chamber, a pair of seals are provided for sealing each of the pairs of apertures. One seal is concentric with the one aperture in order that, with the apertures aligned, the seal will prevent leakage into or from the interior of the housing. A second seal encircles the first seal and extends radially away from the first seal in a direction coincident with the movement of the chamber portion which causes misalignment of the apertures. Accordingly, the second seal prevents escape of contaminants from the misaligned apertures while the first and second seals cooperate in the misaligned mode to prevent communication of the two apertures.

2 Claims, 6 Drawing Figures

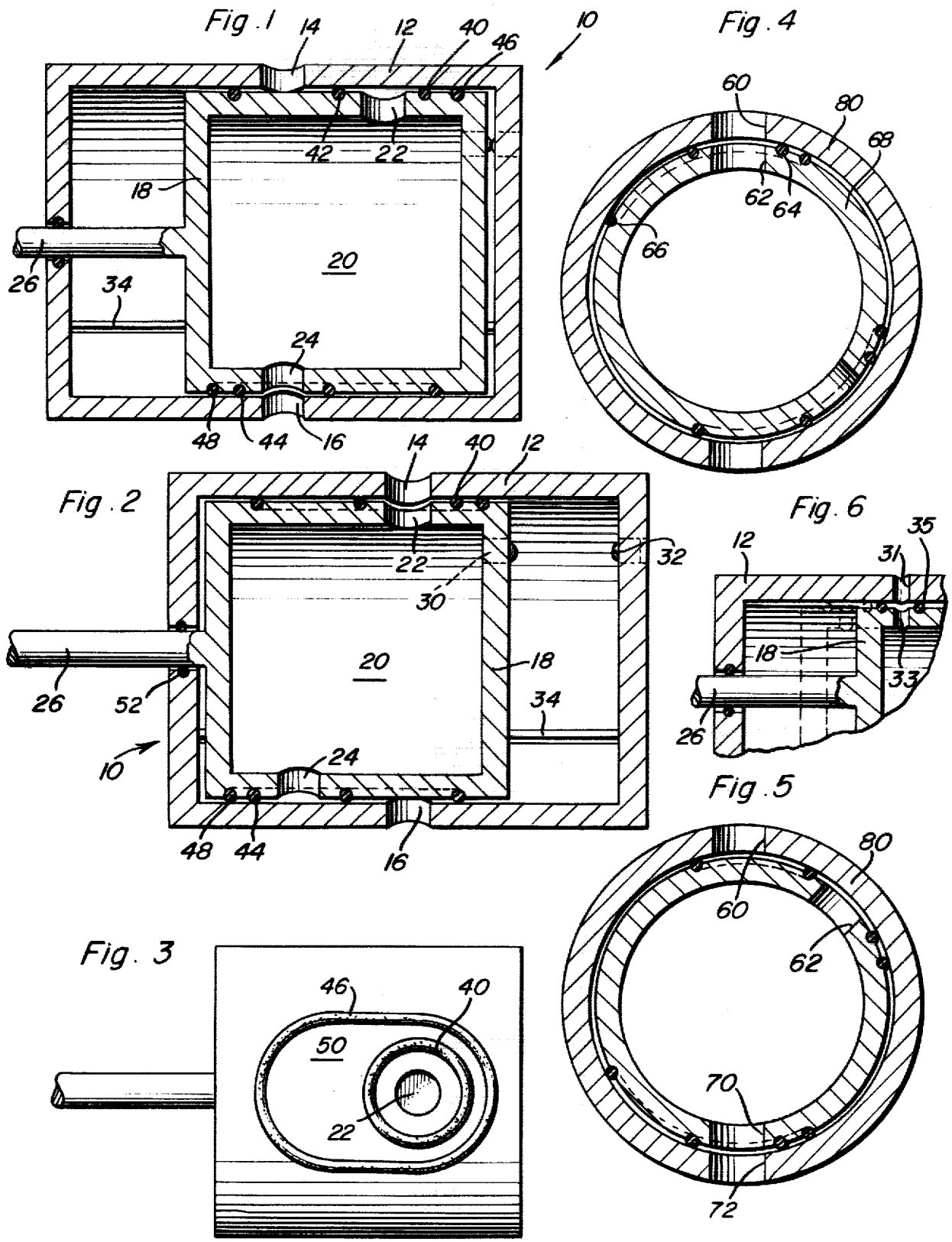

SEAL FOR COMPRESSED AIR LINE DRAIN DEVICE

BACKGROUND OF THE INVENTION

1. Field of the Invention

This invention relates to drain devices for compressed air lines and especially to the seals used in such devices to effect efficient removal of contaminants from compressed air lines.

2. Discussion of Related Art

Various means of sealing the intake and the exhaust ports of a valve mechanism have been proposed. For instance, U.S. Pat. No. 2,433,732 issued Dec. 30, 1947 to Brown concerns a valve structure embodying a sealing means formed of moldable non-metallic plastic material which surrounds at least one of the ports of the valve and cooperates with the body in the chamber to prevent leakage therebetween. U.S. Pat. No. 3,166,097 issued Jan. 19, 1965 to Hinderer et al shows a shear seal valve incorporating a closure having a slot extending from the periphery of the closure to an interior chamber. The slot is defined substantially by upper and lower intersecting planes both transverse to the axis of the closure and by verging outwardly from each other from an area of intersection. An oblique sealing ring is mounted peripherally of the closure and substantially parallels one oblique plane. U.S. Pat. No. 3,201,007 issued Aug. 17, 1965 to Transeau shows a rotary feeder mechanism having a plurality of rotary blades mounted within and sealed against the inner wall of a stator. The sealing mechanism prevents axial flow communication between the rotor and the end plates of the device and comprises peripheral seals cooperating with the rotor blade tip assembly to cojointly provide means which completely seal each individual rotor pocket. U.S. Pat. No. 3,768,518 issued Oct. 30, 1973 to Roth et al shows a fluid transfer valve having a housing with a hollow interior and an elongated tubular piston slidingly disposed within the hollow interior. A teflon O-ring seal provides a fluid tight seal between the tubular piston and the hollow interior in which the piston slides. One or more O-ring seals are disposed peripherally about the tubular piston.

SUMMARY OF THE INVENTION

One object of the present invention is to provide a seal for a compressed air line drain device which is easy to install and effective in use for sealing a low or high pressure compressed air line from the atmosphere while still providing a surface upon which a piston containing a chamber can easily slide.

A further object of the present invention is to provide a seal for a compressed air line drain device which can use standardly available components and uses a minimum number of these components to effect a reliable seal.

An even still further object of the present invention is to provide a seal for a compressed air line drain device which is effective in use in the same configuration on either a valve having an axially displaceable chamber or a valve having a rotary chamber.

In accordance with the above inventions, the present invention provides a seal having essentially an O-ring within an O-ring construction. The seal is used on a compressed air line drain device which has an outer housing and an inner piston containing a chamber. The piston includes a pair of apertures which align respectfully with a pair of apertures in the housing with one pair of apertures aligning at a time when the piston is displaced within the housing. In order to effect a tight seal, one O-ring is disposed about each of the apertures on the piston on the external surface of the piston. This O-ring is essentially concentric with its respective aperture. A second O-ring encircles the first O-ring and the first aperture and a portion extends radially of the first aperture, thereby defining an area for enclosing the associated housing aperture when the two apertures are in their non-aligned position. When non-aligned, the outer O-ring prevents leakage of the compressed air line to the interior of the housing while the inner O-ring prevents fluid communication between the apertures. When in the aligned position, the inner O-ring provides primary sealing against leakage to the interior of the housing while the outer O-ring provides a secondary seal for the same purpose.

These, together with other objects and advantages which will become subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 shows an elevational sectional view of a compressed air line drain device incorporating the seal of the present invention with the device disposed in its drain port open position.

FIG. 2 shows an elevational sectional view of a compressed air line drain device incorporating the seal of the present invention with the device shown in its inlet port open position.

FIG. 3 is a top plan view of the piston of a compressed air line drain device incorporating the seal of the present invention.

FIG. 4 is an end elevational sectional view showing a rotary embodiment of a compressed air line drain device incorporating the seal of the present invention with the device shown in its inlet port open position.

FIG. 5 is an end elevational sectional view of a rotary embodiment of a compressed air line drain device incorporating the seal of the present invention with the device shown in its drain port open position.

FIG. 6 is a fragmental sectional view of the compressed air line drain device of FIG. 1 showing an alternate venting mechanism.

DESCRIPTION OF THE PREFERRED EMBODIMENT

Now with reference to the drawings, a compressed air line drain device incorporating a seal of the present invention and generally referred to by the reference numeral 10 will be described in detail. Initially, it should be noted that compressed air line drain device 10 can function in a system as disclosed in U.S. Pat. No. 4,135,542, the disclosure of which is incorporated herein by reference thereto. The compressed air line drain device 10 itself includes a generally cylindrical housing 12 having an inlet aperture 14 which is to be connected to the compressed air line and an outlet aperture 16 for allowing the draining of contaminants from the compressed air system. Disposed within the housing 12 is a generally cylindrical piston 18 which has a hollow chamber 20 for storing contaminants prior to their removal from the system. The contaminants enter chamber 20 through inlet aperture 22 which is alignable with housing inlet aperture 14, as shown in FIG. 2, to form an inlet port which allows contaminants from the system to enter chamber 20. The piston 18 is displaceable axially within housing 12 in order that apertures 14 and 22 can be aligned. Likewise, an outlet aperture 24 is included in the piston for alignment with an outlet aperture 16 of the housing to form an outlet port for contaminants. By movement of the piston through actuator shaft 26, the piston can be displaced within the housing to align either the inlet port apertures or the outlet port apertures as desired. Under normal operating conditions, apertures 14 and 22 will be aligned thus opening the inlet port and allowing contaminants to drain under gravity into chamber 20. Periodically, piston 18 will be displaced by movement of actuator shaft 26 to the position shown in FIG. 1, thereby allowing the contaminants to drain through the outlet port comprising apertures 16 and 24. The piston 18 also contains one or more spring loaded release valves such as shown at 30 and 32 to vent chamber 20 to atmosphere during discharge of contaminants through the outlet port. Valve 30 coacts with valve 32 disposed on the interior of the housing wall for this purpose. A ridge 34 can be disposed upon the internal surface of the housing. Ridge 34 is received in a depression formed in the piston to insure aganst rotation of the piston.

In order to adequately seal the compressed air system from atmospheric pressure, it is necessary to insure a tight seal between the piston and the internal surface of the housing. Due to the normally high pressures of a compressed air system, the effect of the seal is significant if pressure is not to be lost from the system. The seal of the present invention provides a first O-ring seal about each of the apertures 22 and 24, as seen in FIG. 3. The first O-ring seal 40 disposed about aperture 22 is set in a circular groove 42 which is formed coaxially with the aperture. Similarly, an O-ring 44 surrounds aperture 24. A second O-ring 46, seen most clearly in FIG. 3, surrounds O-ring and aperture 22. In like manner, O-ring 48 surrounds O-ring 44 and aperture 24. It can be seen that O-ring 46 surrounds a space 50 which extends radially away from aperture 22. O-rings 40, 44, 46 and 48 provide a surface upon which the piston 18 can ride thereby insuring smooth motion of that piston when it is displaced within housing 12. At the same time, when any two apertures are aligned, as for example apertures 14 and 22 in FIG. 2, it can be seen that the O-ring surrounding that aperture, viz. 40 and 46, provide a double surrounding seal for the aligned apertures thus insuring that the inlet port provides communication only from the system to the chamber 20. When the apertures are misaligned thereby closing the inlet port, as seen in FIG. 1, inner O-ring 40 serves to provide to provide an effective separation between the apertures 14 and 22 while outer O-ring 46 insures that inlet aperture 14 does not communicate with the interior of the housing 12. A further seal 52 can be used to surround the actuator shaft 26 to insure that the interior of housing 12 is sealed from the atmosphere except when valves 30 and 32 are open.

An alternate form of the venting mechanism for venting the chamber 20 is shown in FIG. 6. There is will be seen that in place of valves 30,32 a pair of alignable openings 31,33 are formed in the housing 12 and piston 18, respectively. An O-ring 35 is mounted on the piston and surrounds the opening 33. When the openings are aligned, the O-ring 35 forms a seal between them. When the openings are not aligned, as shown in dotted lines, O-ring 35 serves to separate the opening 33 from the interior of the housing.

FIGS. 4 and 5 show a rotary embodiment of the seal for compressed air lines as specifically disclosed in the above-mentioned U.S. Pat. No. 4,135,542. In FIG. 4, it can be seen that the inlet port comprises aligned apertures 60 and 62 with aperture 62 being surrounded by a first circular O-ring 64 and a second O-ring which surrounds O-ring 64 but has one area spaced from O-ring 64 circumferentially of the rotor 68. Accordingly, with the apertures aligned as shown in FIG. 4, a double seal comprising O-rings 64 and 66 is provided surrounding the inlet port. When the rotor is displaced as seen in FIG. 5 to align apertures 70 and 72 thereby opening the outlet port, aperture 60 is positioned between the O-rings 64 and 66 and thus it is sealed both from the interior of the housing 80 and from communication with port 62. Obviously, a pair of O-rings is similarly positioned about the outlet comprising apertures 70 and 72.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In a drain device having a housing with an inlet aperture and an outlet aperture, a piston having an inlet aperture and an outlet aperture, said piston being displaceable within said housing between a first position wherein said inlet apertures are aligned, and a second position wherein said outlet apertures are aligned, the improvement comprising:

first seal means concentrically positioned about said piston inlet;

second seal means of a generally oval shape and being positioned about said first seal means in an offset manner whereby a first space is created between said first seal means and said second seal means, said first space being of a greater width toward one end of said housing than toward the other end thereof;

third seal means concentrically positioned about said piston outlet;

fourth seal means of a generally oval shape and being positioned about said third seal means in an offset manner whereby a second space is created between said third seal means and said fourth seal means, said second space being of a greater width toward one end of said housing than toward the other end thereof;

said first and second seal means both serving to seal a port created when said piston and housing inlet apertures are aligned while only said third seal means serves to seal said piston and housing outlet apertures during such alignment, and further wherein said third and fourth seal means both serve to seal piston and housing outlet apertures when aligned while only said second seal means serves to seal said piston and housing inlet apertures during such alignment, and further wherein a pressure release valve is provided for actuation when said piston and housing outlet apertures are aligned and a guide ridge is provided along an interior portion of said housing, such guide ridge being positionable within a depression contained on said piston whereby rotation of said piston within said housing is prevented during a movement of the same therein.

2. The drain device as defined in claim 1, and further wherein said release valve is spring loaded.

* * * * *